United States Patent
Kim

(10) Patent No.: US 9,323,498 B2
(45) Date of Patent: Apr. 26, 2016

(54) MULTIPLIER CIRCUIT WITH DYNAMIC ENERGY CONSUMPTION ADJUSTMENT

(71) Applicant: WISCONSIN ALUMNI RESEARCH FOUNDATION, Madison, WI (US)

(72) Inventor: Nam Sung Kim, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 404 days.

(21) Appl. No.: 13/800,709

(22) Filed: Mar. 13, 2013

(65) Prior Publication Data

US 2014/0280430 A1    Sep. 18, 2014

(51) Int. Cl.
G06F 7/52 (2006.01)
G06F 7/499 (2006.01)
G06F 7/53 (2006.01)

(52) U.S. Cl.
CPC .............. G06F 7/49942 (2013.01); G06F 7/53 (2013.01)

(58) Field of Classification Search
CPC ................................ G06F 7/49942; G06F 7/53
USPC ................... 708/620–632, 550–553; 364/707
See application file for complete search history.

(56) References Cited

U.S. PATENT DOCUMENTS

| | | | | |
|---|---|---|---|---|
| 5,200,912 A | * | 4/1993 | Asghar et al. | 708/620 |
| 6,604,120 B1 | * | 8/2003 | De Angel | 708/628 |
| 6,957,244 B2 | * | 10/2005 | Jou | G06F 7/523 708/550 |
| 2003/0105792 A1 | * | 6/2003 | Shankar | 708/625 |
| 2007/0174379 A1 | * | 7/2007 | Dockser et al. | 708/625 |

OTHER PUBLICATIONS

Parag Kulkarni, Puneet Gupta, Milos Ercegovac; Trading Accuracy for Power with an Underdesigned Multiplier Architecture; Signal Processing, IEEE VLSID, 2011.
Vinay K. Chippa, Debabrata Mohapatra, Anand Raghunathan, Kaushik Roy, Srimat T. Chakradhar; Scalable Effort Hardware Design: Exploiting Algorithmic Resilience for Energy Efficiency; IEEE DAC 2010, p. 555-560, Anaheim, California.
Vaibhav Gupta, Debabrata Mohapatra, Sang Phill Park, Anand Raghunathan, Kaushik Roy; Impact: IMPrecise adders for low-power Approximate CompuTing; IEEE/ACM ISLPED, 2011;p. 409-414; School of Electrical and Computer Engineering, Purdue University, West Lafayette, IN.

* cited by examiner

*Primary Examiner* — Tan V. Mai
(74) *Attorney, Agent, or Firm* — Boyle Fredrickson, S.C.

(57) ABSTRACT

A fixed point multiplier that can be used in mobile computer systems operating under limited power constraints provides a trade-off between computational accuracy and energy consumption that may be changed dynamically for energy conservation purposes. In one embodiment, the multiplier prestores multiplication shift coefficients to eliminate leading-one circuitry normally used in shift and accumulate multipliers.

14 Claims, 3 Drawing Sheets

MULTIPLIER CIRCUIT WITH DYNAMIC ENERGY CONSUMPTION ADJUSTMENT

STATEMENT REGARDING FEDERALLY SPONSORED RESEARCH OR DEVELOPMENT

This invention was made with government support under 0953603 awarded by the National Science Foundation. The government has certain rights in the invention

CROSS REFERENCE TO RELATED APPLICATION

--

BACKGROUND OF THE INVENTION

The present invention relates to a computer architecture employing a hardware multiplier circuit, and in particular, to a multiplier circuit operating to change its accuracy during run time.

Achieving energy efficiency is important in mobile computing devices such as smart phones and tablets because of their reliance on battery power and the size and weight constraints of such devices which limit battery size and capacity. At the same time, such mobile computing devices are increasingly using sophisticated human machine interfaces (HMIs) relying on techniques such as speech recognition, handwriting recognition, and gesture recognition. Such "recognition" tasks may require large numbers of multiplication operations, for example, associated with matrix multiplication. Demands for high-speed multiplication are normally handled by specialized hardware multipliers. Such hardware multipliers may not be available or practical in portable devices because of their energy demands.

SUMMARY OF THE INVENTION

The present inventor has recognized that many processing tasks including those necessary for advanced HMI systems exhibit "algorithmic fault tolerance" resulting in a graceful degradation in accuracy of the processing task as the accuracy of the underlying computations decreases. This raises the possibility of developing specialized hardware multiplication circuitry that may dynamically change its accuracy (and energy usage) in response to the operating environment, allowing a trade-off between accuracy and energy usage that may make specialized hardware multiplication circuitry practical for portable devices. Low energy consumption is provided during normal usage when low accuracy is acceptable and yet high accuracy can be obtained when demanded. In one embodiment, this trade-off between accuracy and energy usage is realized by controlling a number of iterations of a shift and accumulate multiplier. Accuracy may be dynamically adjusted according to the particular computational task, energy management strategies, or detected error thresholds in the application program.

The invention also provides, in one embodiment, a shift and accumulate hardware multiplication circuit that can substantially reduce the electrical energy required for multiplication by pre-computing multiplicand shift amounts rather than computing them on the fly with a "leading-one detector". The present inventor has recognized that this pre-computation is possible in many recognition tasks associated with HMI's where relatively static multiplier coefficient values are used.

Specifically then, the present invention provides an electronic computer system having a processor for the execution of arithmetic and logic instructions and including a multiplier circuit for the multiplication of data values, wherein the multiplier circuit provides a variable accuracy. An accuracy controller communicates with the multiplier circuit to change the accuracy of the multiplier circuit during execution of instructions by the processor.

It is thus a feature of at least one embodiment of the invention to provide a computer system that may flexibly adjust the accuracy of the multiplier circuit to changing demands experienced by the computer system.

The multiplier circuit may be a fixed point multiplier.

It is thus a feature of at least one embodiment of the invention to provide adjustability in the simplest form of multiplier likely to be most suitable for portable devices.

The multiplier circuit may consume less electrical energy at lower accuracies.

It is thus a feature of at least one embodiment of the invention to allow flexible trade-off between energy and accuracy that allows a more sophisticated multiplier circuitry to be used in low energy capacity portable devices.

The accuracy circuit may respond to instructions received by the processor core explicitly changing accuracy of the multiplier.

It is thus a feature of at least one embodiment of the invention to permit explicit control of multiplier accuracy, for example, by particular application programs or the operating system.

Alternatively or in addition, the accuracy circuit may monitor a power consumption of the processor core to change accuracy of the multiplier as a function of power consumption.

It is thus a feature of at least one embodiment of the invention to provide a multiplier circuit that may work well with energy management systems used on integrated circuits.

Alternatively or in addition, the accuracy circuit may receive an error signal indicating an error in a calculation employing the multiplier and changes the accuracy of the multiplier as a function of the error signal.

It is thus a feature of at least one embodiment of the invention to provide a dynamic accuracy control that may respond in the manner of a feedback circuit or heuristic algorithm to application errors and thereby optimize the trade-off between energy and accuracy in a variety of different applications.

The multiplier may employ a multiply and accumulate process with varying numbers of iterations of multiply and accumulate to provide variable accuracy as a function of the number of iterations.

It is thus a feature of at least one embodiment of the invention to provide a simple method of changing the accuracy of the multiplier in a way that reduces energy consumption with lower accuracy.

The multiplication may be provided by a shifting of a multiplicand datum based on a leading-one detection of the multiplier datum.

It is thus a feature of at least one embodiment of the invention to provide a system that may use well-known shift and accumulate multiplier circuitry.

The electronic computer processor may further include a coefficient memory holding stored values indicating successive locations of ones in given multiplier data and wherein the multiplication may be provided by shifting of a multiplicand datum based on the prestored values in the coefficient memory for the given multiplier data.

It is thus a feature of at least one embodiment of the invention to provide high energy efficiency in the execution of algorithms that have relatively constant multipliers, for example recognition algorithms, where the multipliers represent a test for particular recognized symbols.

In this regard the electronic computer may include a memory holding a stored program employing repeated multiplications to implement at least one of an artificial neural network, liquid state machine, and support vector machine.

It is thus a feature of at least one embodiment of the invention to provide an improved multiplier suitable for use with common algorithms used in advanced human machine interface such as exhibit algorithmic fault tolerance.

In this regard, the memory may hold a program providing at least one of handwriting recognition, speech recognition, or gesture recognition, and wherein the multiplier provides multiplications of predetermined coefficients to data received by a human machine interface.

It is thus a feature of at least one embodiment of the invention to provide a system permitting advanced recognition tasks on low-power computing devices.

These particular objects and advantages may apply to only some embodiments falling within the claims and thus do not define the scope of the invention.

DETAILED DESCRIPTION OF THE PREFERRED EMBODIMENT

Figure 1:
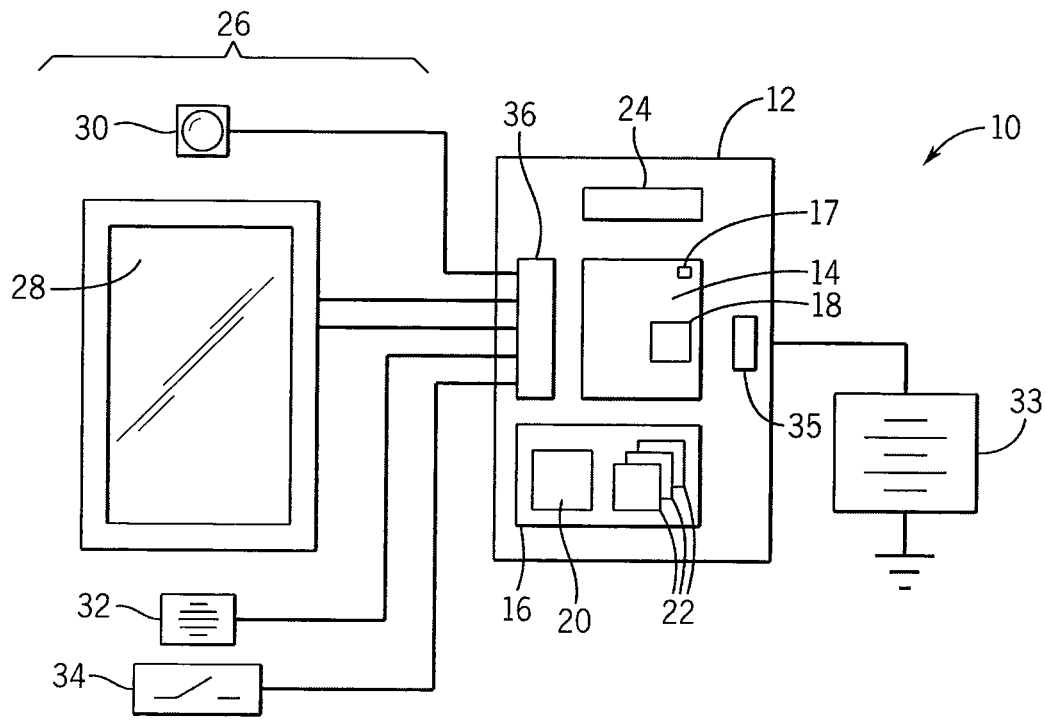
FIG. 1 is a simplified block diagram of the circuitry of an example mobile device such as a cell phone showing a processor having a multiplier circuit of the present invention.

Referring now to FIG. 1, a portable computational device 10, such as a cell phone, may provide a hardware platform 12, for example, contained on a circuit card or the like, composed of inter-communicating circuit elements including a processor 14 and associated memory 16.

The processor 14 may be a single or multicore processor and may include a hardware multiplier circuit 18 as will be described below either integrated into the processor or as a coprocessor. In one embodiment, the processor 14 or another element of the platform 12 may provide for a temperature sensor 17 as will be discussed below.

As is generally understood in the art, during operation of the computational device 10, the processor 14 executes programs contained in the memory 16 including, for example, an operating system 20 and multiple application and driver programs 22. The memory may also include data files (not shown) holding data used by the operating system 20 or application and driver programs 22.

The portable computational device 10 may provide for a human machine interface 26 including, for example, a graphic touch screen 28 allowing for touch inputs and the display of graphic information on an LCD screen or the like, a digital camera 30, a microphone 32, and one or more electrical switches 34 that may include a keyboard. Signals to and from each of these elements may pass through interface circuit 36 also communicating with the processor 14.

When the portable computational device 10 is a cell phone, the processor 14 may also communicate with a radiofrequency transceiver 24 or the like providing for radiofrequency communications and associated protocols including cell phone protocols, wireless protocols such as IEEE 802.11 and the like, Bluetooth and other such communication formats.

The portable computational device 10 may receive power from a battery 33 that may be monitored and controlled by battery management circuit 35, the latter which may monitor the charge state of the battery and may control power usage of the other circuit elements of the hardware platform 12 to conserve battery power including, for example, turning off various of the circuit elements described above including a backlight on the touch screen 28 and putting the processor 14 or other circuit elements into a sleep state and limiting power usage by the radiofrequency transceiver 24.

While a cell phone has been described, it will be recognized that similar structure is used in many portable electronic devices including tablet and laptop computers and this description is intended to provide useful background rather than to be limiting. It will also be appreciated that these functional blocks need not be separate circuit elements but may be arbitrarily allocated among different or single integrated circuits and are presented as discrete functional blocks for clarity of description. In general, these functions may be freely allocated between dedicated hardware and software.

Figure 2:
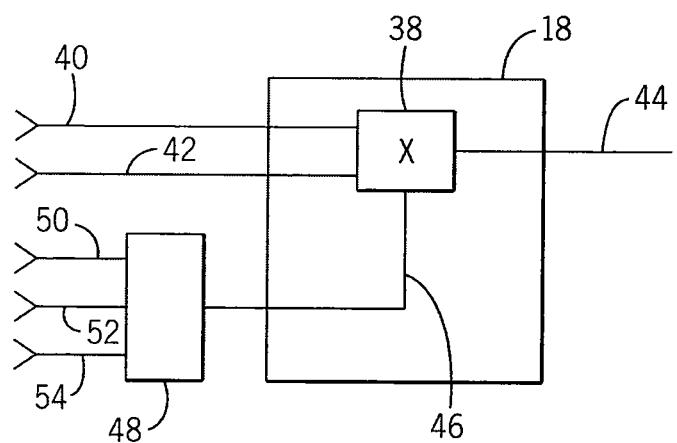
FIG. 2 is a simplified block diagram of the multiplier circuit having multiplier elements that may receive a multiplicand and multiplier, and accuracy input to provide an output product whose accuracy is determined by the accuracy input.

Referring now to FIG. 2, in the present invention, the hardware multiplier circuit 18 may include a multiplier element 38 having inputs for receiving a multiplicand 40 and multiplier 42 in the form of parallel binary digital data to provide a product 44 output as parallel binary digital data. For reasons of energy savings and simplicity, the multiplier 42 may be a fixed point multiplier to be distinguished from a floating-point multiplier which keeps separate track of a mantissa and exponent.

The hardware multiplier circuit 18 may also receive an accuracy input 46 defining the accuracy of the product 44 with respect to the multiplicand 40 and multiplier 42. In this context, accuracy generally indicates the number of bits of significance in the arithmetic product.

The accuracy input 46 may be generated by an accuracy controller 48 that may output the accuracy input 46 as a function of any one or combination of different input electrical signals including an instruction input 50 derived from a special instruction executed by the processor 14 defining a desired accuracy of the multiplier element 38. This special instruction, when executed by the processor 14, decodes to provide an explicit accuracy input 46 directly to the multiplier element 38. This allows the programmer to control the accuracy of the multiplier element 38 directly.

Alternatively or in addition, the accuracy controller 48 may accept power control input 52, for example, from the battery management circuit 35, this power control input 52 controlling the accuracy of the multiplier element 38 to conserve electrical power. For example, the power control input 52 may be obtained from the battery management circuit 35 to lower the energy consumption of the hardware multiplier circuit 18, for example, as battery-powered decreases or energy-saving modes are triggered. The temperature sensor 17 may provide an alternative source of the power control input 52 to reduce multiplier power if circuit temperature rises above a predetermined value.

Alternatively or in addition, the accuracy controller 48 may receive an accuracy feedback input 54 derived from the interface circuit 36 indicating an accuracy of calculations relying on the hardware multiplier circuit 18. For example, the accuracy of interpretation of user inputs from the HMI 26 into predefined symbols, as will be described, may be used to provide this accuracy feedback input 54. By detecting the effects of changing accuracy of the multiplier element 38, the accuracy of the multiplier element 38 may be tailored to a particular "recognition" problem such as gesture recognition, handwriting recognition, speech recognition and the like.

Figure 3:
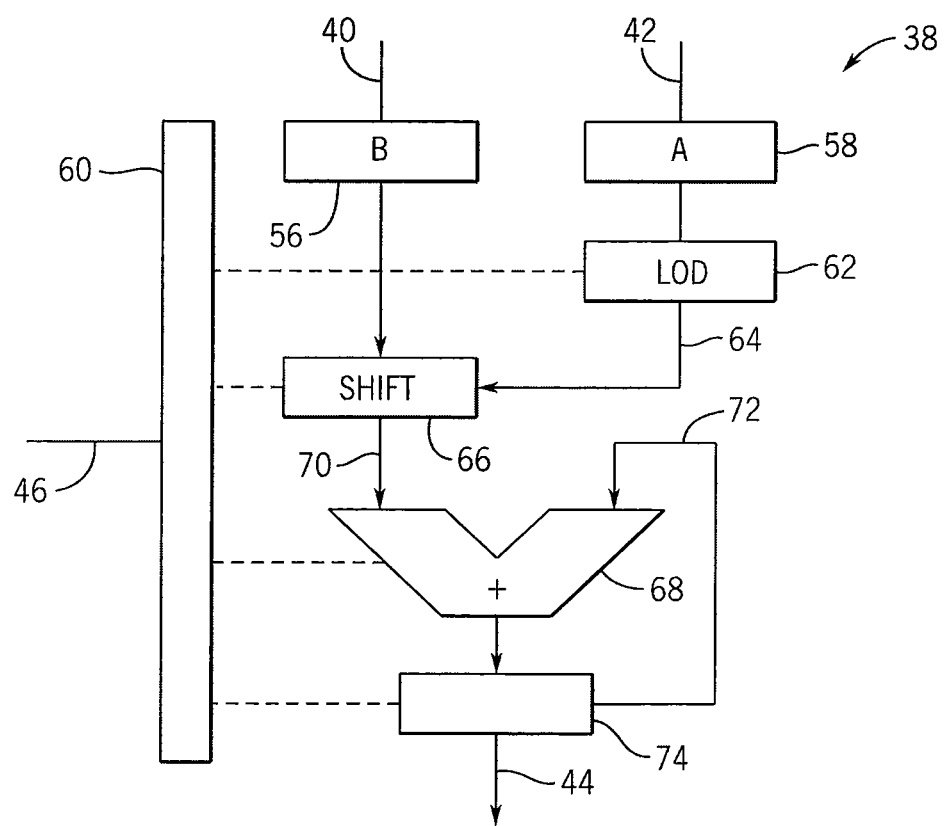
FIG. 3 is a more detailed block diagram of a first embodiment of the multiplier element of FIG. 1 showing a shift and accumulate circuit using leading-one detection.

Referring now to FIG. 3, in one embodiment, the multiplier element 38 may provide for a first register 56 (B) receiving the multiplicand 40 and a second register 58 (A) receiving the multiplier 42. The multiplicand 40 and multiplier 42 may be multiplied in a set of repeated shift and accumulate stages managed by an iteration controller 60. The accuracy of the multiplication will be determined by the number of stages of the iteration.

One stage will now be described with respect to the multiplication of a multiplicand 40 having a value of 90 in base 10 (i.e., $90_{10}$) and a multiplier 42 having a value of 125 in base 10 (i.e., $125_{10}$). The binary equivalent values of the multiplicand 40 and multiplier 42 are $01011010_2$ and $01111101_2$ respectively. In a first step of a stage of iteration, the multiplier 42 is evaluated to determine the location of the most significant "one" bit by a leading-one detector 62. In this example, that location will be the sixth place in $01111101_2$. This leading-one position value 64 is provided to a shift register 66 which also receives the value of the multiplicand 40 from register 56 and shifts the value held by register 56 left by six places to provide the value of $01011010000000_2$ or ($5760_{10}$). It will be understood that left shifting of binary values by N places is equivalent to multiplication of the binary value by $2^N$.

This result from the shift register 66 is provided to adder 68 as one addend 70. The second addend 72 is derived from an accumulator register 74 and is initially zero. The accumulator register 74 then, in this first stage of iteration, receives the value of $5760_{10}$ which represents a 51 percent accurate representation of the ultimate product of $125_{10} \times 90_{10} = 11250_{10}$.

Continuing with this example, the iteration controller 60 may then provide for a second stage of iteration in which the value of the multiplier 42 held in register 58 is provided to the leading-one detector 62 to provide the next leading-one position which in this case is 5. Detection of the earlier leading-one may be blocked by a mask generated by the first detection that is successively updated by an exclusive OR process.

This latest shift value of 5 is provided to the shift register 66 which shifts the value of the multiplicand 40 in register 56 by five places to provide a value of $0101101000000_2$ or ($2880_{10}$) which is added to the value contained in accumulator register 74 by adder 68 to produce a value of $8640_{10}$ being 77 percent accurate.

More stages of iterations lead to higher accuracy but also higher energy consumption because of the repeated operation of each of these elements of the multiplier element 38. After a third stage of iteration, the accuracy of the number held in the accumulator register 74 is 89 percent and after four iterations an accuracy of approximately 100 percent is obtained.

As determined by the iteration controller 60, at the conclusion of the iterations the product 44 may be released from accumulator register 74. Thus, it can be understood that by controlling the number of iterations by the iteration controller 60, the accuracy of a product 44 ultimately output from the accumulator register 74 at the conclusion of the iteration may be controlled, with increased numbers of iterations increasing energy consumption and decreased numbers of iteration decreasing energy consumption.

Each of the elements of the registers 56 and 58, the leading-one detector 62, the shift register 66, the adder 68, and the accumulator register 74 are preferably realized as discrete logic circuits to operate at high speed, in contrast to an implementation software running on a standard general-purpose processor.

Figure 4:
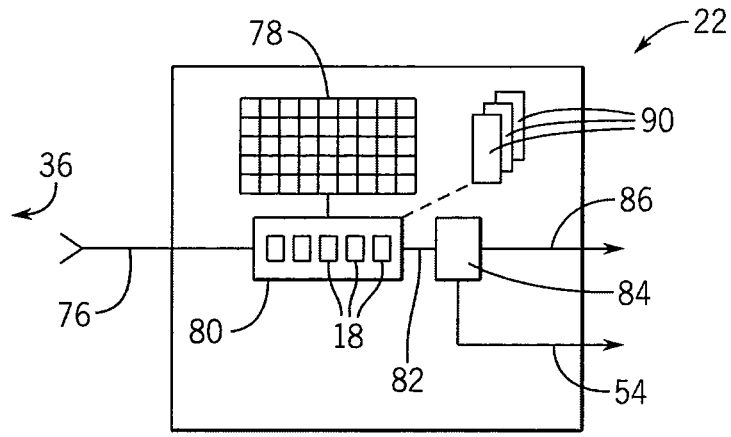
FIG. 4 is a simplified data flow diagram of a recognition task typical of an HMI in which data from the HMI is compared against stored template coefficients, for example, by using matrix vector multiplication, and the output of this matrix vector multiplication is then matched to permissible symbols, further showing the storage of shift values related to the template coefficients for use by the embodiment of the multiplier of FIG. 5, and further showing outputting of a confidence value in the selected symbol that may be used in feedback control of multiplier accuracy.

Referring now to FIG. 4, in a typical recognition task such as speech recognition, handwriting recognition, gesture recognition, image recognition or the like, a sensed input, for example, from the HMI 26 may be received in the form of an input vector 76 representing, for example, a set of audio signals for speech recognition or a set of pixel locations for handwriting or gesture recognition. This input vector 76 is received by a recognition driver program 22 to compare that input vector 76 against prestored coefficients 78 representing, in effect, "templates" for known symbols (e.g. particular words or letters or commands recognized by the recognition system). This comparison may use any of a variety of algorithms including but not limited to: artificial neural networks, liquid state machines, support vector machines or the like.

Extracting modeled symbols from input vectors 76 typically involves matrix/vector multiplication that may be performed by matrix multiplier 80 incorporating one multiplier circuit 18 or multiple series-connected hardware multiplier circuits 18 in an accelerator hardware structure. The result of these multiplications typically provides a set of weights associated with different possible symbols in the form of an output vector 82. This output vector may then be mapped to a particular symbol by a mapper 84, for example, according to the symbol with the highest weighting. It is appreciated that this is a highly simplified description of a variety of techniques which may also include those that assess the probability of a sequence of symbols using, for example, hidden Markov models or the like.

The ultimate result of this process is an output symbol 86 that represents the result of the recognition problem. In this process, the mapper 84 may also produce a symbol confidence value reflecting the closeness of the symbol match. This confidence value may provide the accuracy feedback input 54 described above for controlling the accuracy of the hardware multiplier circuit 18. The closer the match, the more confidence there is in the recognition process and, accordingly, the accuracy feedback input 54 may be used to lower the accuracy of the hardware multiplier circuit 18 to conserve energy. In contrast, matches that are not close may produce an accuracy feedback input 54 that increases the accuracy of the hardware multiplier circuit 18. In this regard, the accuracy controller 48 may perform short "experiments" providing a perturbation analysis that adjusts the accuracy of the hardware multiplier circuit 18 to assess the effect on application performance (by any of a number of metrics including confidence in the recognition process, speed, or the like), and then sets this accuracy feedback input 54 to be a constant for a predetermined interval before another experiment is conducted, thereby saving the energy required for this assessment process and providing more consistent operation.

The coefficients 78 used in these recognition problems are substantially constant representing, for example, a fixed vocabulary of words that may be recognized. This is true even if the vocabulary is periodically adjusted slightly. For this reason each of the coefficients 78 may be processed before use by the multiplier 80 to identify its leading-one values and to extract the positions of the leading-ones into a shift vector 90 associated with each coefficient 78. The shift vector essentially lists the positions of the successive "one" values of the coefficients 78. Thus, for example, a coefficient value of 1010 would produce a shift vector 90 of {3, 1}.

Figure 5:
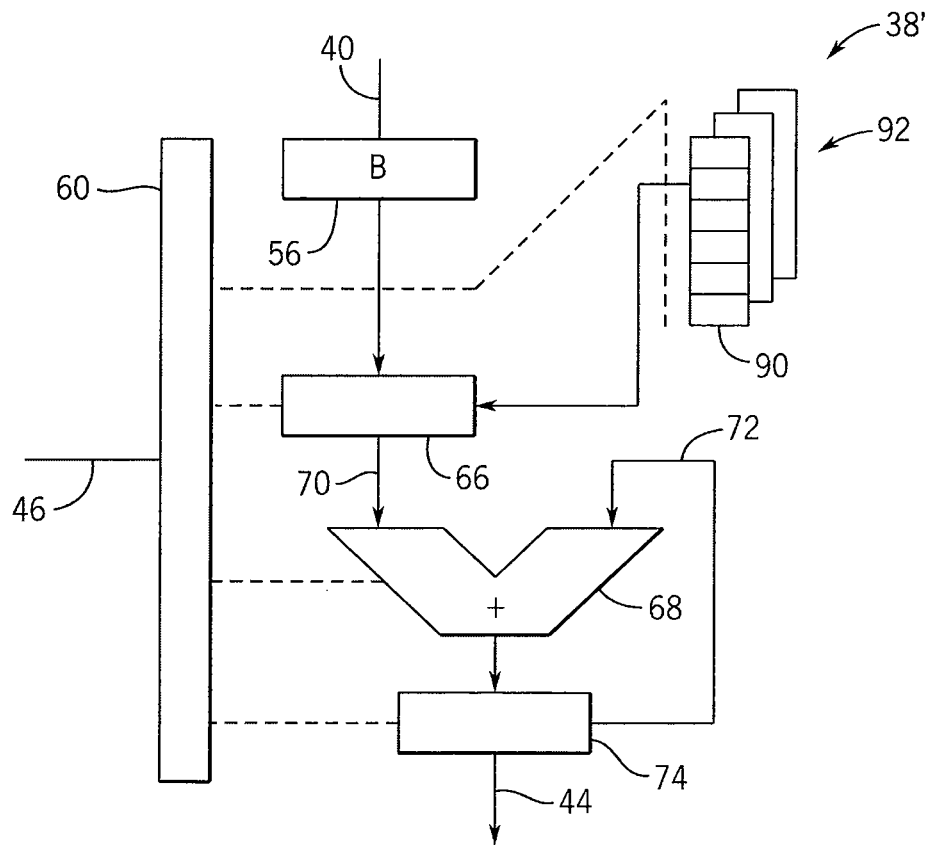
FIG. 5 is a figure similar to that of FIG. 3 showing an alternative embodiment of the multiplier element of the present invention using the shift values of FIG. 4.

Referring now to FIG. 5, in an advanced multiplier element 38', register 58 (A) shown in FIG. 3 may be replaced with a shift vector register 92 holding the shift vector 90 associated with given coefficients 78 that would have been loaded into the multiplier 42. In sequence according to the number of the iteration stage, successive elements of the shift vectors 90 for a given coefficient 78 are sent directly to the shift register 66 eliminating the need for the leading-one detector 62. By eliminating the leading-one detector 62, additional energy savings are possible as well as possibly higher processing speeds.

The shift vectors 90 for each coefficient 78 may be calculated off-line (that is in a separate computer, for example, at the time of generation of the application program 22) and loaded into memory 16, or may be calculated by the processor 14 after loading of the application program 22, or may be implemented by a separate leading-one detector circuit operating in the background.

While the present application has been described with respect to its use in human machine interfaces including speech recognition, handwriting recognition gesture recognition and the like, it should be understood that the invention is not limited to these applications although it provides a particular benefit in these applications particularly when used in the mobile device.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a computer" and "a processor" or "a core" can be understood to include one or more processors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

I claim:

1. An electronic computer system comprising:
   a processor providing for execution of arithmetic and logic instructions and including a fixed point multiplier circuit for multiplication of data values, wherein the multiplier circuit provides a variable accuracy; and
   an accuracy controller communicating with the multiplier circuit to change the accuracy of the multiplier circuit during execution of instructions by the processor.

2. The electronic computer system of claim 1 wherein the multiplier circuit consumes less electrical energy at lower accuracies.

3. The electronic computer system of claim 2 wherein the accuracy controller responds to instructions received by the processor core explicitly changing accuracy of the multiplier.

4. The electronic computer system of claim 2 wherein the accuracy controller monitors a power consumption of the processor core to change accuracy of the multiplier as a function of power consumption.

5. The electronic computer system of claim 2 wherein the accuracy controller varies the accuracy of the multiplier circuit while monitoring an effect of the accuracy variation to provide a closed loop accuracy control of the multiplier circuit changing dynamically during operation of the processor core.

6. The electronic computer system of claim 2 wherein the multiplier employs a multiply and accumulate process with varying numbers of iterations of multiply and accumulate to provide variable accuracy as a function of the number of iterations.

7. The electronic computer system of claim 6 wherein the multiplication is provided by a shifting of a multiplicand datum based on a leading-one detection of the multiplier datum.

8. The electronic computer system of claim 6 further including a coefficient memory holding stored pre-processed values indicating successive locations of ones in given multiplier data and wherein the multiplication is provided by shifting of a multiplicand datum based on the stored values in the coefficient memory for the given multiplier data.

9. The electronic computer system of claim 1 further including a memory holding a stored program employing repeated multiplications to implement at least one of an artificial neural network, liquid state machine, and support vector machine.

10. The electronic computer system of claim 1 further including a memory holding a program providing at least one of signal processing applications including classification and recognition applications, and wherein the multiplier provides multiplications of predetermined coefficients to data received by a human machine interface.

11. The electronic computer system of claim 1 further including:
- a human machine interface;
- a memory; and
- a battery providing power to the human machine interface, the memory, and the processor core.

12. The electronic processor of claim 11 further including a human machine interface processing system providing a confidence value indicating a confidence in deriving a symbol from an interaction by a user with the human machine wherein the accuracy controller receives the confidence value and changes accuracy of the multiplier circuit as a function of the confidence value to increase accuracy as the confidence value decreases.

13. The electronic computer system of claim 1 further comprising a power management circuit, wherein the power management circuit monitors the charge state of a power source, and wherein the accuracy controller monitors a power control input from the power management circuit to change accuracy of the multiplier as a function of power consumption.

14. The electronic computer system of claim 13 wherein the power source is a battery.

* * * * *